United States Patent [19]

Noda

[11] 4,327,365

[45] Apr. 27, 1982

[54] THERMAL PRINTER

[75] Inventor: Atsushi Noda, Yokohama, Japan

[73] Assignee: Canon Kabushiki Kaisha, Tokyo, Japan

[21] Appl. No.: 105,883

[22] Filed: Dec. 20, 1979

[30] Foreign Application Priority Data

Dec. 27, 1978 [JP] Japan ................................ 53-165873

[51] Int. Cl.³ ................................................ G01D 15/10

[52] U.S. Cl. ................................................ 346/76 PH

[58] Field of Search ............. 346/76 R, 139 C, 76 PH

[56] References Cited

U.S. PATENT DOCUMENTS 4,070,680 1/1978 Shelley ............................ 346/76 PH

*Primary Examiner*—George H. Miller, Jr.

*Attorney, Agent, or Firm*—Fitzpatrick, Cella, Harper & Scinto

[57] ABSTRACT

A thermal printer includes a recording head having plural thermal elements arranged diagonally with respect to the row (or column) of characters to be recorded on a recording medium control circuit for activating said plural thermal elements on time-division basis to perform recording on said recording medium, and displacing means for displacing relative position of said recording head with respect to said recording medium for every time-division activation of said recording head by said control means.

1 Claim, 8 Drawing Figures

THERMAL PRINTER

BACKGROUND OF THE INVENTION

1. Field of the Invention

The present invention relates to a thermal printer.

2. Description of the Prior Art

The conventional thermal printers are classified into a serial recording system and a parallel recording system. In the former, the recording is achieved by a thermal head having 1×7 or 5×7 heating elements maintained in contact with a recording paper and displaced in a direction to perform the recording of a row. On the other hand in the latter system, there is employed a recording head RH having a plurality of 5×1 or 5×7 heating elements arranged in a line as shown in a perspective view in FIG. 1 wherein a recording paper RM is advanced while said recording head is maintained in a fixed position in contact with said recording paper to perform the recording of a row. The recording method with a recording head RH having a line of 5×1 heating elements is generally called a dot-line printing method.

The conventional recording head for such dot-line recording method has a structure as shown in FIG. 2, wherein the heating elements are arranged in a line. FIG. 3 shows the circuit for said recording head RH, wherein there are provided a common terminal CT and dot terminals DT respectively corresponding to the heating elements HE, so that the recording of a line can be achieved by supplying a current to the corresponding dot terminals. FIG. 4 shows an example of the characters recorded by such recording head RH.

In recording with the above-mentioned printer, each row of characters is composed of seven dot lines, namely from the first dot line to the seventh dot line. The recording of a row is thus completed by the printing of said seven dot lines, followed by paper advancement corresponding to three dot lines. For recording such dot line, the recording head RH can be energized in one of the following two methods. In a first method all the heating elements are simultaneously energized according to the information to be recorded. Such method requires an elevated amount of electric power and thus a large apparatus. In a second method the heating elements HE of a dot line are divided into a certain number of blocks which are energized in succession with a time delay therebetween. In such method, because of the time delay in a dot line, the heating elements of initial blocks are cooled before the completion of recording of a dot line and tend to cause the sticking phenomenon. This phenomenon is specific to thermal printers and is caused by the adhesion of recording paper to the recording head by the solidified heat-sensitive ink, causing a resistance to the paper advancement and eventually resulting in disabled advancement of paper. Consequently it is desirable to advance the paper immediately after the recording.

SUMMARY OF THE INVENTION

Thus the object of the present invention is to provide a thermal printer now associated with the above-mentioned drawbacks and capable of functioning with an improved reliability, with a reduced power consumption and without the sticking phenomenon.

Another object of the present invention is to provide a thermal printer comprising a recording head having plural heating elements arranged diagonally with respect to the character line (or character column) to be recorded on a recording medium, control means for activating said plural heating elements on a time-divided basis to perform the recording on the recording medium, and means for displacing the relative position of said recording head with respect to the recording medium upon each time-divided activation of said recording head.

Still other objects of the present invention will be made apparent from the following description of the embodiments to be taken in conjunction with the attached drawings.

DESCRIPTION OF THE PREFERRED EMBODIMENT

Figure 1:
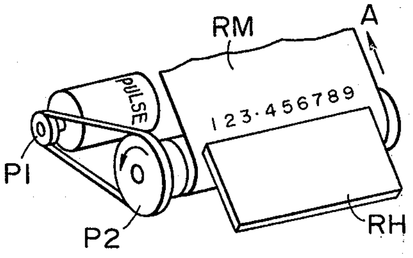
FIG. 1 PRIOR ART
FIG. 1 is a perspective view of a conventional thermal printer.
Figure 2:
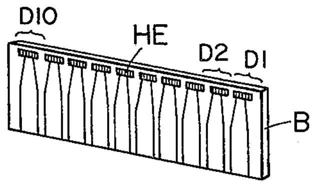
FIG. 2 PRIOR ART
FIG. 2 is a view of a conventional thermal head.
Figure 3:
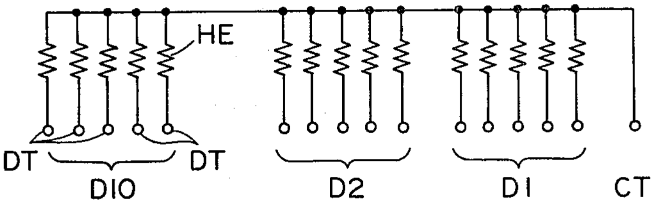
FIG. 3 PRIOR ART
FIG. 3 is a diagram of the drive circuit for a conventional thermal head.
Figure 4:
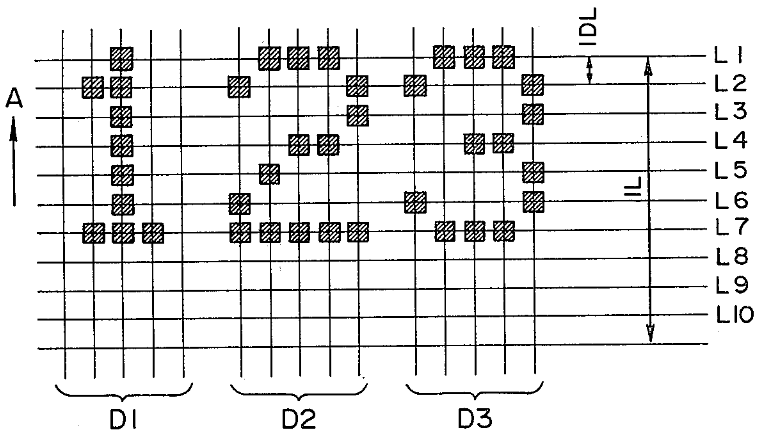
FIG. 4 PRIOR ART
FIG. 4 is an explanatory view of a recording.
Figure 5:
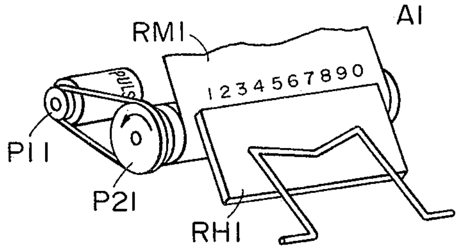
FIG. 5 is a perspective view of a thermal printer of the present invention.

Referring to FIG. 5 showing a thermal printer of the present invention in a perspective view, a recording head RH1 is maintained in pressure contact with a recording sheet RM1 placed on a platen 1 which is rotated by a stepping motor M for advancing said recording sheet RM1 in the direction of arrow A1.

Figure 6:
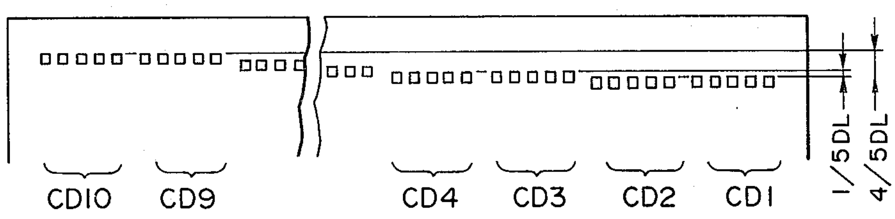
FIG. 6 is a view of a thermal head of the present invention.

FIG. 6 shows the arrangement of heating elements HE1 on the recording head RH1 shown in FIG. 5. For printing ten characters in a row, there are provided five recording blocks (or groups of thermal elements), each recording block comprising two thermal elements, CD1–CD10 each composed of five dots and stepwise positioned for every two characters, wherein the height of each step is equal to one-fifth of the dot line spacing.

Figure 7:
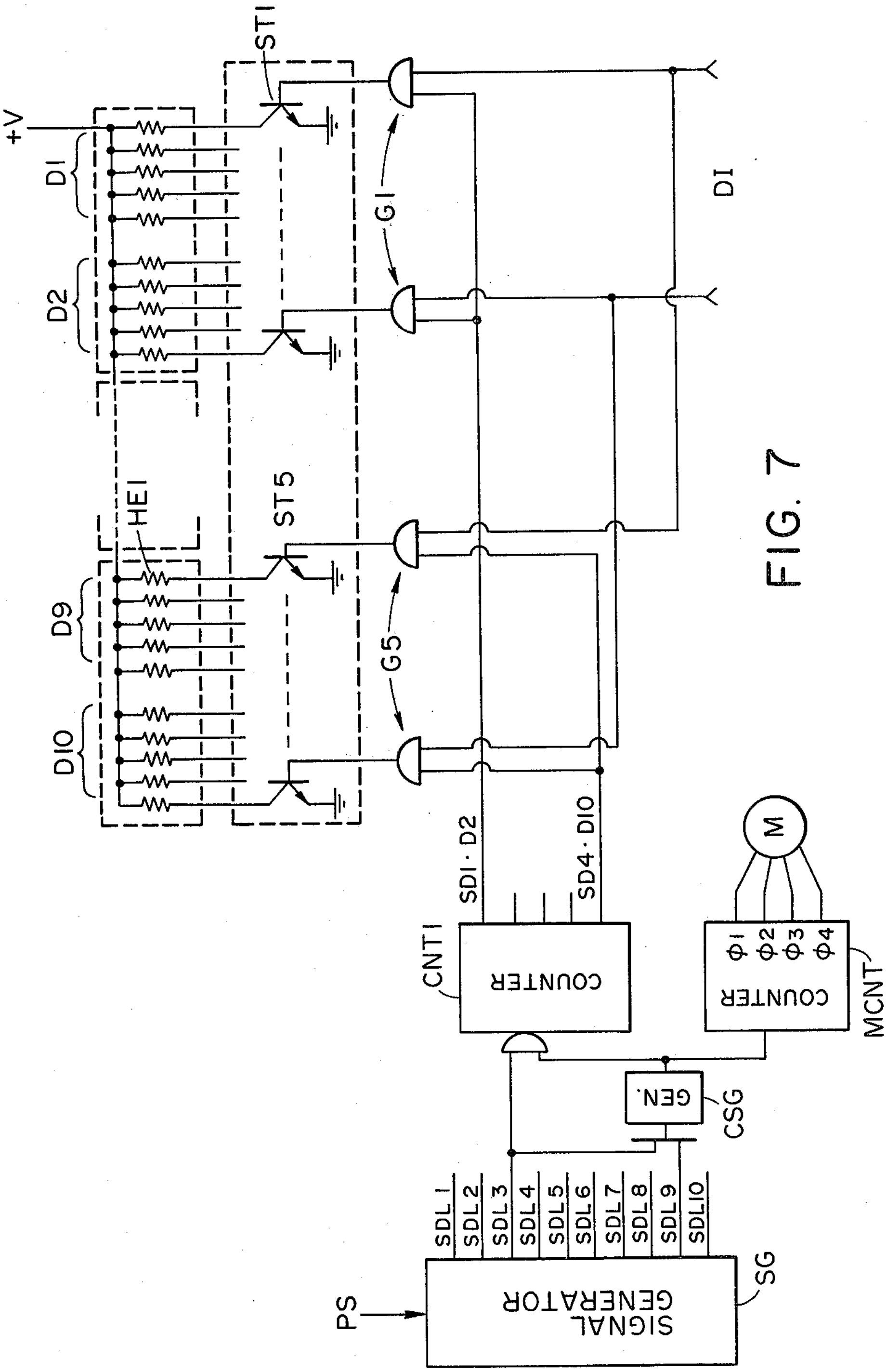
FIG. 7 is a diagram of the control circuit therefor.

FIG. 7 shows a block diagram of the control circuit for activating the heating elements HE1 shown in FIG. 6, wherein SG is a signal generator which generates, in case of printing the characters with a 5×7 dot matrix and with a spacing corresponding to three dot lines between the rows as in the present embodiment, ten pulses of different phases in response to a print instruction signal PS. CSG is a signal generator releasing five pulses in response to the signal from said signal generator SG, said pulses CP being supplied through an AND gate AG controlled by the signal generator SG to a counter CNT1 for activating the heating elements HE1 on time-divided basis. Said counter CNT1 releases the signals SD1·D2, . . ., SD9·D10.

Said signal SD1·D2 for activating the recording blocks CD1, D2 is supplied to a gate group G1, whereby the dot information DI is supplied through a switching element ST1 to said recording blocks CD1 and CD2. Similarly the signal SD9·D10 for activating the recording blocks CD9, CD10 is supplied to a gate group G5, whereby the dot information DI is supplied through a switching element ST5 to said recording blocks CD9 and CD10.

MCNT is a counter for generating signals $\phi 1$–$\phi 4$ in response to the pulse signals CP from the signal generator CSG to drive the four-phase stepping motor M, which is shown in FIG. 5 and is step advanced by each pulse CP, wherein the diameter of pulleys P11 and P12 is selected in such a manner that the recording sheet RM1 is advanced by a distance equal to one-fifth of the spacing of dot lines by each step advancement of said motor. The above-explained embodiment functions in the following manner.

Upon receipt of the print instruction signal PS, the signal generator SG generates the signal SDL1 in response to which the signal generator CSG releases the pulse signals CP in succession. In response to said pulse signals CP the counter MCNT releases the signals $\phi 1$, $\phi 2$, $\phi 3$ and $\phi 4$ shown in FIG. 8, and the counter CNT releases the signals SD1·D2, SD3·D4, SD5·D6, SD7·D8 and SD9·SD10 to perform the recording of one dot line in synchronization with the advancement of the recording sheet RM1.

Figure 8:
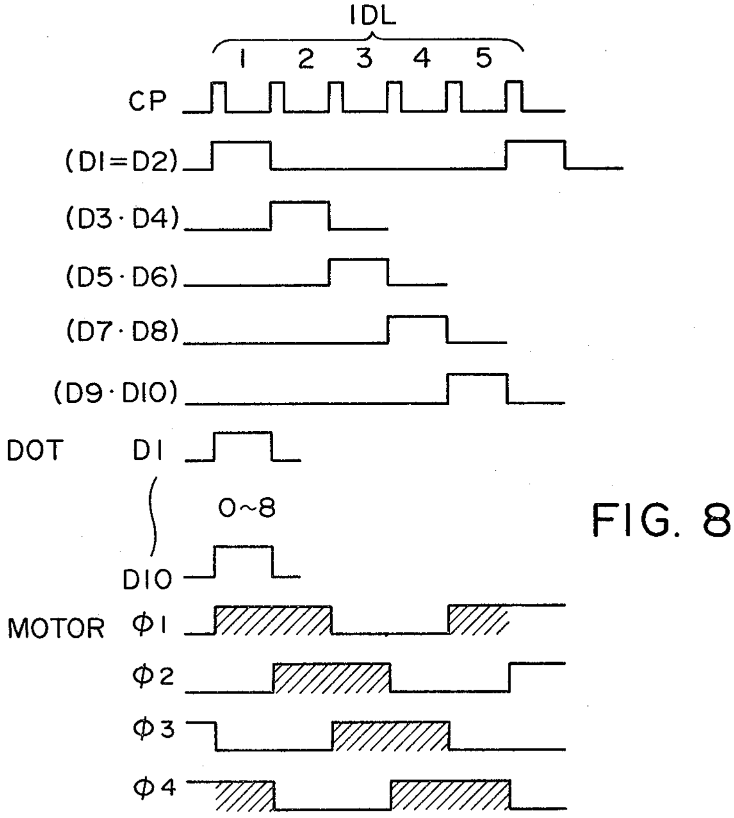
FIG. 8 is a wave-form chart thereof.

More specifically, in response to the first pulse signal from the signal generator CSG, the signal SD1·D2 and the signals $\phi 1$ and $\phi 4$ assume the high-level state as shown in FIG. 8. The signal SD1·D2 opens the gate group G1 whereby the pattern information corresponding to one dot line of two characters is supplied from a memory storing the recording information through said gate group G1 to the switching element ST1 to selectively activate the heating elements HE1 in the recording blocks CD1, CD2 thereby performing the recording of one dot line on the recording sheet RM1 advanced by the stepping motor M.

Then in response to the succeeding pulse signal from the signal generator CSG, the counters CNT and MCNT change the signals SD3·D4, $\phi 1$ and $\phi 2$ to the high-level state. In response thereto the stepping motor M is step advanced to correspondingly advance the recording sheet RM1, and simultaneously the dot information DI is supplied from an unrepresented memory through said a gate group (not shown) opened by said signal SD3·D4 to the recording blocks CD3 and CD4 to perform the recording of one dot line.

The recording of a complete dot line is completed when the recording of a dot line for two characters is conducted by the recording blocks CD9 and CD10 in the above-explained manner, and the recording of the second dot line is initiated by the signal SDL2 supplied from the signal generator SG. In this manner the recording of one row is completed when the signal generator releases the signal SDL7, and the recording sheet RM1 is advanced without recording by three dot lines by the signals SDL8, SDL9 and SDL10 to complete the recording operation of one row.

As explained in the foregoing, the thermal printer of the present invention requires a smaller power consumption than those of the prior art and at the same time avoids the sticking phenomenon, since the recording head is activated on time-divided basis and the relative position of the recording head with respect to the recording sheet is displaced upon each time-divided activation of the recording head.

Although the foregoing description has been made on an example of printer having ten characters in a row, a similar effect can be obtained in case the number of characters in a row is larger or smaller. Also each recording block (or thermal element group), containing two characters in the foregoing embodiment, may also contain only one character or three or more characters. Also the recording head, which is of a stationary type in the foregoing embodiment, may be of a movable type for achieving a same effect. Furthermore the amount of displacement of the relative position may be selected as different from the foregoing explanation.

What I claim is:

1. A thermal printer comprising:

a thermal head having a plurality of one line dot thermal element groups (N) corresponding to a plurality of characters to be printed in a row or column on a recording medium, wherein said thermal element groups are disposed along a substantially longitudinal direction and are displaced relative to one another by a predetermined pitch perpendicular to said substantially longitudinal direction;

control means for driving the thermal element groups (N) of said thermal head in a time-divided fashion with time-divided signals N; and means for changing the relative positional relationship between said recording medium and said thermal head by said predetermined pitch in response to each activation of each of said thermal element groups N by said control means.

* * * * *